(12) United States Patent
Mori

(10) Patent No.: US 10,381,862 B2
(45) Date of Patent: Aug. 13, 2019

(54) BATTERY MODULE VOLTAGE CONTROL DEVICE, BATTERY MODULE, AND POWER SUPPLY SYSTEM

(71) Applicant: Murata Manufacturing Co., Ltd., Nagaokakyo-shi, Kyoto-fu (JP)

(72) Inventor: Michiya Mori, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/203,971

(22) Filed: Nov. 29, 2018

(65) Prior Publication Data

US 2019/0097452 A1 Mar. 28, 2019

Related U.S. Application Data

(63) Continuation of application No. PCT/JP2017/020423, filed on Jun. 1, 2017.

(30) Foreign Application Priority Data

Jun. 2, 2016 (JP) .................................. 2016-110980

(51) Int. Cl.
  *H02J 7/00* (2006.01)
  *H02J 7/04* (2006.01)
  (Continued)

(52) U.S. Cl.
  CPC .............. *H02J 7/045* (2013.01); *G06F 1/263* (2013.01); *H01M 10/44* (2013.01); *H02J 3/24* (2013.01);
  (Continued)

(58) Field of Classification Search
  CPC ........ H02J 7/045; H02J 7/0065; H02J 7/0068; H02J 3/46; H02J 9/00; H02J 3/32;
  (Continued)

(56) References Cited

U.S. PATENT DOCUMENTS 3,716,774 A * 2/1973 Lace .......................... H02J 7/16
                                                                  320/123
4,284,944 A * 8/1981 Iwanaga ................ H01M 10/44
                                                                  320/139

(Continued)

FOREIGN PATENT DOCUMENTS

JP        S54104947 U     7/1979
JP        H0670544 A     3/1994
(Continued)

OTHER PUBLICATIONS

International Search Report issued for PCT/JP2017/020423, dated Aug. 22, 2017.

(Continued)

*Primary Examiner* — Robert Grant
*Assistant Examiner* — John T Trischler
(74) *Attorney, Agent, or Firm* — Arent Fox LLP

(57) ABSTRACT

A power supply system including a battery module and a converter unit. The system includes a bidirectional DC-DC converter as a component of a battery module voltage control device that is connected between a load and a secondary battery and that changes a discharge voltage of the secondary battery and outputs the discharge voltage to the load. Moreover, a voltage control unit, which can include a control unit and the bidirectional DC-DC converter, changes the discharge voltage of the secondary battery to an output voltage target value to be outputted to the load.

20 Claims, 8 Drawing Sheets

(51) Int. Cl.
*H02M 3/00* (2006.01)
*G06F 1/26* (2006.01)
*H01M 10/44* (2006.01)
*H02J 3/24* (2006.01)
*H02J 3/28* (2006.01)
*H02J 3/32* (2006.01)
*H02J 3/38* (2006.01)
*H02J 9/00* (2006.01)
*G06F 1/30* (2006.01)
*H02J 3/00* (2006.01)
*H02J 3/46* (2006.01)

(52) U.S. Cl.
CPC .................... *H02J 3/28* (2013.01); *H02J 3/32* (2013.01); *H02J 3/38* (2013.01); *H02J 7/0065* (2013.01); *H02J 7/0068* (2013.01); *H02J 9/00* (2013.01); *H02M 3/00* (2013.01); *G06F 1/305* (2013.01); *H02J 3/005* (2013.01); *H02J 3/46* (2013.01); *H02J 2003/002* (2013.01); *H02J 2007/0039* (2013.01)

(58) Field of Classification Search
CPC ...... H02J 3/38; H02J 3/24; H02J 3/02; H01M 10/44; G06F 1/263
USPC .......................................................... 320/162
See application file for complete search history.

(56) References Cited

U.S. PATENT DOCUMENTS

| | | | | |
|---|---|---|---|---|
| 4,315,208 A * | 2/1982 | McElroy | G05F 1/563 | 307/64 |
| 4,412,170 A * | 10/1983 | Roesel, Jr. | H02J 9/066 | 307/64 |
| 5,182,463 A * | 1/1993 | Yamamoto | H02J 3/32 | 307/46 |
| 5,220,495 A * | 6/1993 | Zulaski | G01R 15/144 | 320/148 |
| 5,563,802 A * | 10/1996 | Plahn | H02J 9/062 | 290/1 R |
| 5,572,108 A * | 11/1996 | Windes | H02M 1/32 | 320/167 |
| 5,723,970 A * | 3/1998 | Bell | H01M 10/46 | 320/140 |
| 5,739,667 A * | 4/1998 | Matsuda | H02J 7/0072 | 320/128 |
| 6,194,793 B1 * | 2/2001 | Fisher, Jr. | H02J 7/0068 | 307/66 |
| 6,194,873 B1 * | 2/2001 | Matsushita | G05F 1/575 | 320/137 |
| 6,381,156 B1 * | 4/2002 | Sakai | H02J 1/10 | 307/66 |
| 6,430,692 B1 * | 8/2002 | Kimble | G06F 1/263 | 307/66 |
| 6,433,522 B1 * | 8/2002 | Siri | G05F 1/67 | 320/101 |
| 6,507,507 B2 | 1/2003 | Tokunaga et al. | | |
| 6,621,181 B2 * | 9/2003 | McCombs | H02J 3/32 | 307/66 |
| 6,643,152 B2 | 11/2003 | Tokunaga et al. | | |
| 6,657,319 B2 * | 12/2003 | Sanada | H02J 1/12 | 307/45 |
| 6,911,809 B2 * | 6/2005 | Kernahan | G05F 3/262 | 323/283 |
| 6,917,188 B2 * | 7/2005 | Kernahan | H02J 7/0065 | 323/211 |
| 6,940,188 B2 * | 9/2005 | Okuma | H02J 9/062 | 307/66 |
| 7,180,268 B2 * | 2/2007 | Denning | H02J 7/0031 | 320/134 |
| 7,199,552 B2 * | 4/2007 | Kobayashi | H02J 7/0068 | 320/106 |
| 7,245,185 B2 * | 7/2007 | Litovsky | H02J 7/345 | 330/297 |
| 7,550,873 B2 * | 6/2009 | Jiang | H02J 9/061 | 307/64 |
| 7,615,965 B2 * | 11/2009 | Popescu-Stanesti | H02J 1/08 | 307/46 |
| 7,656,061 B2 * | 2/2010 | Litovsky | H03F 1/0238 | 307/154 |
| 7,734,937 B2 * | 6/2010 | Yano | H02J 1/10 | 399/88 |
| 7,768,229 B2 * | 8/2010 | Zhang | B60L 53/53 | 320/104 |
| 7,830,035 B2 * | 11/2010 | Yoshida | H02J 9/061 | 307/18 |
| RE42,114 E * | 2/2011 | Matsuda | H02J 9/061 | 320/128 |
| 7,880,330 B2 * | 2/2011 | Litovsky | H02J 7/345 | 307/45 |
| 7,888,907 B2 * | 2/2011 | Litovsky | H02J 7/0004 | 307/46 |
| 8,084,886 B2 * | 12/2011 | Hirahara | H02J 9/061 | 307/64 |
| 8,203,311 B2 * | 6/2012 | Takahashi | H01M 10/44 | 320/134 |
| 8,212,516 B2 * | 7/2012 | Goto | H01M 16/006 | 180/65.31 |
| RE43,911 E * | 1/2013 | Matsuda | H02J 9/061 | 320/162 |
| 8,633,659 B2 * | 1/2014 | Tanaka | H05B 33/0815 | 315/186 |
| 8,786,132 B2 * | 7/2014 | Morita | H01M 10/44 | 307/66 |
| 9,007,038 B2 * | 4/2015 | Shizuya | H01L 31/02021 | 323/224 |
| 9,048,687 B2 * | 6/2015 | Nakajima | H02J 1/108 | |
| 9,178,433 B2 * | 11/2015 | Jutras | G06F 1/26 | |
| 9,351,369 B2 * | 5/2016 | Miyamoto | H05B 33/0809 | |
| 9,762,058 B2 * | 9/2017 | Youn | G06F 1/30 | |
| 9,783,067 B2 * | 10/2017 | Daqqa | B60L 11/18 | |
| 9,846,403 B2 * | 12/2017 | Yamamoto | H02J 7/34 | |
| 10,074,982 B2 * | 9/2018 | Itaya | H02J 3/16 | |
| 10,116,163 B2 * | 10/2018 | Nasiri | H02J 9/061 | |
| 2002/0031000 A1 * | 3/2002 | Sakai | H02J 1/10 | 363/65 |
| 2002/0067630 A1 | 6/2002 | Norikazu et al. | | |
| 2003/0090155 A1 * | 5/2003 | Sanada | H02J 1/12 | 307/45 |
| 2003/0107906 A1 | 6/2003 | Norikazu et al. | | |
| 2004/0095106 A1 * | 5/2004 | Kernahan | G05F 3/262 | 323/282 |
| 2004/0095118 A1 * | 5/2004 | Kernahan | H02J 7/0065 | 323/282 |
| 2005/0002212 A1 * | 1/2005 | Okuma | H02J 9/062 | 363/50 |
| 2005/0162146 A1 * | 7/2005 | Kobayashi | H02J 7/0068 | 323/318 |
| 2005/0212489 A1 * | 9/2005 | Denning | H02J 7/0031 | 320/134 |
| 2005/0280312 A1 * | 12/2005 | Litovsky | H02J 7/345 | 307/64 |
| 2007/0194759 A1 * | 8/2007 | Shimizu | H02J 7/0016 | 320/166 |
| 2007/0200432 A1 * | 8/2007 | Yano | H02J 1/10 | 307/44 |
| 2008/0048499 A1 * | 2/2008 | Litovsky | H02J 7/345 | 307/45 |
| 2008/0094034 A1 * | 4/2008 | Takahashi | H01M 10/44 | 320/134 |
| 2008/0174276 A1 * | 7/2008 | Takahashi | H02J 9/061 | 320/128 |
| 2008/0179956 A1 * | 7/2008 | Jiang | H02J 9/061 | 307/66 |
| 2009/0108681 A1 * | 4/2009 | Litovsky | H03F 1/0238 | 307/110 |

(56) References Cited

U.S. PATENT DOCUMENTS

| | | | |
|---|---|---|---|
| 2009/0110214 A1* | 4/2009 | Litovsky | H02J 7/0004 381/106 |
| 2009/0243390 A1* | 10/2009 | Oto | H02J 7/34 307/43 |
| 2009/0315401 A1* | 12/2009 | Yoshida | H02J 9/061 307/44 |
| 2010/0308659 A1* | 12/2010 | Morita | H01M 10/44 307/66 |
| 2010/0327655 A1 | 12/2010 | Okamoto et al. | |
| 2011/0001453 A1* | 1/2011 | Goto | H01M 10/44 320/101 |
| 2011/0006607 A1* | 1/2011 | Kwon | G06F 1/30 307/66 |
| 2011/0121653 A1* | 5/2011 | Hartular | H02J 1/10 307/66 |
| 2011/0133560 A1* | 6/2011 | Yamashita | G06F 1/30 307/66 |
| 2011/0260617 A1* | 10/2011 | Tanaka | H05B 33/0815 315/82 |
| 2013/0076143 A1* | 3/2013 | Guo | H02J 9/04 307/66 |
| 2013/0099573 A1* | 4/2013 | Nakajima | H02J 1/108 307/64 |
| 2014/0103710 A1* | 4/2014 | Daqqa | B60L 11/18 307/10.1 |
| 2014/0184160 A1* | 7/2014 | Huang | H02J 7/0042 320/114 |
| 2014/0217956 A1* | 8/2014 | Kinomura | B60L 53/51 320/101 |
| 2014/0266129 A1* | 9/2014 | Clark | H02J 7/0065 323/304 |
| 2014/0340941 A1* | 11/2014 | Jutras | G06F 1/26 363/21.01 |
| 2015/0008746 A1* | 1/2015 | Youn | G06F 1/30 307/65 |
| 2015/0123480 A1* | 5/2015 | Xu | H02J 7/0068 307/66 |
| 2016/0043588 A1* | 2/2016 | Carletti | H02M 1/4225 320/107 |
| 2016/0064986 A1* | 3/2016 | Langlinais | G06F 1/263 320/134 |
| 2016/0172857 A1* | 6/2016 | Itaya | H02J 3/16 700/298 |
| 2016/0342128 A1* | 11/2016 | Yamamoto | H02J 7/34 |
| 2017/0310107 A1* | 10/2017 | Youn | G06F 1/30 |
| 2017/0310205 A1* | 10/2017 | Coleman | H02M 1/15 |
| 2018/0083477 A1* | 3/2018 | Tian | H02M 3/335 |
| 2018/0262042 A1* | 9/2018 | Tian | H02M 3/335 |
| 2018/0358661 A1* | 12/2018 | Yebka | H01M 10/44 |
| 2018/0375177 A1* | 12/2018 | Mori | H01M 2/10 |

FOREIGN PATENT DOCUMENTS

| | | |
|---|---|---|
| JP | 2002171692 A | 6/2002 |
| JP | 2008306878 A | 12/2008 |
| JP | 2011125124 A | 6/2011 |
| JP | 2013021865 A | 1/2013 |
| JP | 2015154552 A | 8/2015 |
| WO | 2009107680 A1 | 9/2009 |

OTHER PUBLICATIONS

Written Opinion of the International Searching Authority issued for PCT/JP2017/020423, dated Aug. 22, 2017.

* cited by examiner

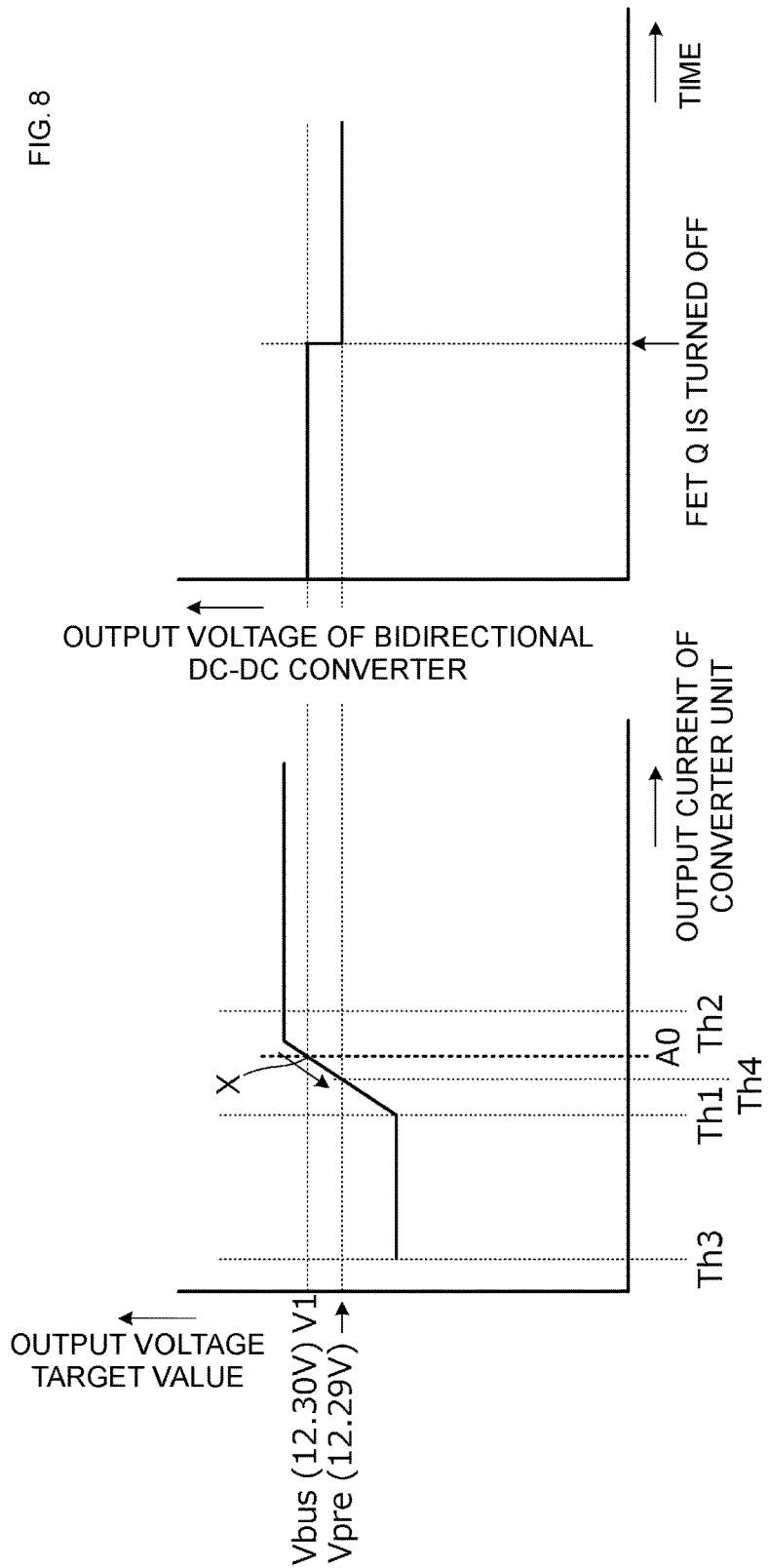

| TIME | TOTAL LOAD CURRENT [A] | PSU UNIT CURRENT [A] | OUTPUT CURRENT OF BATTERY MODULE (FORWARD CURRENT OF FET Q) [A] | STATE OF CONVERTER IN BATTERY MODULE | STATE OF FET Q | Vbus-Vpre [mV] | Va | COM OUTPUT |
|---|---|---|---|---|---|---|---|---|
| 1 | 0 | 0 | 0 | | OFF | 300 | Hi | Lo |
| 2 | 95 | 95 | 0 | | OFF | 50 | Hi | Lo |
| 3 | 99.2 | 99.2 | 0 | | OFF | 8 | Hi | Lo |
| 4 | 99.5 | 99.5 | 0 | | OFF | 5 | Hi | Lo |
| 5 | 99.8 | 99.8 | 0 | | OFF→ON | 2→0 | Hi | Lo→Hi |
| 6 | 100 | 100 | 0 | | ON | 0 | Hi | Hi |
| 7 | 101 | 100 | 1 | | ON | -1 | Hi | Hi |
| 8 | 130 | 100 | 30 | | ON | -30 | Hi | Hi |
| 9 | 101 | 100 | 1 | | ON | -1 | Hi | Hi |
| 10 | 100 | 100 | 0 | | ON | 0 | Hi | Hi |
| 11 | 99 | 99 | 0 | | ON→OFF | 0→10 | Hi→Lo→Hi | Hi→Lo |
| 12 | 95 | 95 | 0 | | OFF | 50 | Hi | Lo |
| 13 | 95 | 95 | 0 | | OFF | 50 | Hi | Lo |
| 14 | 95 | 95 | 0 | ABNORMAL | OFF | 50 | Hi | Lo |
| 15 | 95 | 95 | 0 | ABNORMAL | OFF | 50 | Hi | Lo |
| 16 | 95 | 95 | 0 | ABNORMAL | OFF | 50 | Hi | Lo |
| 17 | 95 | 95 | 0 | ABNORMAL | OFF | 50 | Hi | Lo |

FIG. 9

BATTERY MODULE VOLTAGE CONTROL DEVICE, BATTERY MODULE, AND POWER SUPPLY SYSTEM

CROSS REFERENCE TO RELATED APPLICATIONS

The present application is a continuation of PCT/JP2017/020423 filed Jun. 1, 2017, which claims priority to Japanese Patent Application No. 2016-110980, filed Jun. 2, 2016, the entire contents of each of which are incorporated herein by reference.

TECHNICAL FIELD

The present disclosure relates to a battery module that assists in power supply to a load, a voltage control device therefor, and a power supply system including the battery module.

BACKGROUND

When a blackout or the like occurs during operation of a computer, various troubles such as data loss and system failure occur. Thus, there is an uninterruptible power supply device that stably supplies power to a load (a computer, etc.) even when a sudden blackout occurs. Patent Document 1 (identified below) discloses an uninterruptible power supply device that performs stable power supply to a load by continuing power supply from a secondary battery to the load during stop of a power supply unit that supplies power to the load.

The uninterruptible power supply device described in Patent Document 1 includes a secondary battery that supplies power to a load; and a plurality of power supply units connected in parallel. Moreover, each power supply unit limits an output current to a predetermined value, has constant power drooping characteristics of drooping an output voltage when it is necessary to output an output current equal to or higher than the predetermined value, and controls output power to be constant. Each power supply unit supplies power to the load and also charges the secondary battery. The uninterruptible power supply device calculates maximum output power for one power supply unit, sets the maximum output power value for each power supply unit, and controls the constant power drooping characteristics of each power supply unit.

Patent Document 1: Japanese Unexamined Patent Application Publication No. 2015-154552.

However, when the load is an information processing system device, such as a server, a voltage drop may cause unstable operation. Therefore, the power supply device in Patent Document 1 having constant power drooping characteristics is not suitable as a power supply device for an information processing system device such as a server.

SUMMARY OF THE INVENTION

Therefore, an object of the present disclosure is to provide a battery module that supplies a stable voltage to a load, a voltage control device therefor, and a power supply system including the battery module.

According to an exemplary aspect, a battery module voltage control device is disclosed that includes a voltage control unit connected between a load and a secondary battery and configured to change a discharge voltage of the secondary battery to an output voltage target value for a voltage to be outputted to the load, and output the discharge voltage to the load. Moreover, an output current value acquisition unit acquires an output current value that is output from a converter unit configured to perform constant voltage control for outputting a predetermined constant voltage when the output current falls within a range of equal to or lower than a predetermined value, and to output a voltage to the load. The output voltage target value is set such that, when the output current value acquired by the output current value acquisition unit is equal to or higher than a first threshold, which is lower than the predetermined value, the output voltage target value increases with increase of the output current value. Moreover, when the output current value is between a second threshold lower that is than the predetermined value and the first threshold, the output voltage target value is higher than an output voltage of the converter unit.

A battery module according to the present disclosure includes the battery module voltage control device and the secondary battery.

A power supply system according to the present disclosure includes the converter unit and the battery module.

With this configuration, in a state where the output current value of the converter unit is equal to or higher than the first threshold and the converter unit performs constant voltage control, the output voltage target value of the battery module is increased. Accordingly, when the load enters a heavy load state, it is possible to supply a stable voltage to the load by supplying power from the battery module to the load. As a result, it is possible to prevent erroneous operation of the load due to voltage reduction.

The voltage control unit may be configured to stop voltage control when the output current value acquired by the output current value acquisition unit is equal to or lower than a third threshold lower than the first threshold.

With this configuration, for example, in the case of a light load state, it is possible to reduce switching loss and the like by stopping the voltage control.

The voltage control unit may be configured to hold a relationship between the output current value and the output voltage target value in a programmable state.

With this configuration, it is possible to adjust a condition (state) for supplying the charge voltage of the secondary battery to the load. Then, the charge voltage of the secondary battery is supplied to the load in a condition (state) where the conversion efficiency of the converter unit is good, such that a constant voltage is continuously supplied to the load, whereby it is possible to keep a state where the efficiency is good.

In an exemplary aspect, the converter unit includes a plurality of convertors connected in parallel and having a current share function based on a current share signal, and the output current value acquisition unit can be configured to acquire the output current value of the converter unit by receiving the current share signal from the converter unit.

With this configuration, a separate circuit for current detection by using the current share signal is not needed.

Moreover, the voltage control unit can be configured to charge the secondary battery with output power of the converter unit when the output current value acquired by the output current value acquisition unit is less than the first threshold.

With this configuration, the charge voltage of the secondary battery can be reduced.

Preferably, a load-connection side of the voltage control unit is OR-connected to the converter unit via an OR connection switching element. In this aspect, the voltage control unit is configured to output a signal for temporarily cutting of the OR connection switching element, when the output current value of the converter unit becomes equal to or less than a fourth threshold lower than a critical current value that is a current value corresponding to the constant voltage of the converter unit in a relationship between the output current value and the output voltage target value.

With this configuration, when the output current value of the converter unit becomes equal to or less than the fourth threshold lower than the critical current value (the current value at which the voltage control unit starts assisting for current), that is, when a state where a back-flow current flows through the OR connection switching element is caused, the OR connection switching element is temporarily cut off, and thus it is possible to assuredly prevent a back-flow state. In addition, as compared to a configuration in which a voltage between both ends of an OR connection switching element is detected and the OR connection switching element is cut off on the basis of only this voltage, it is possible to reduce an error. Thus, even in a small back-flow state, it is possible to assuredly cut off the OR connection switching element, and erroneous operation in which the OR connection switching element is cut off in a state that is actually not a back-flow state, is inhibited.

According to the exemplary aspects of the present disclosure, it is possible to supply a stable voltage from the battery module to the load even in a heavy load state and when the output voltage of the converter unit has been reduced. As a result, it is possible to prevent erroneous operation of the load due to voltage reduction.

BRIEF DESCRIPTION OF DRAWINGS

FIG. 8 illustrates an example of a relationship of an output voltage target value of a bidirectional DC-DC converter 12 with respect to the output current of a converter unit 102 and change of the output voltage of the bidirectional DC-DC converter 12 over time.

FIG. 9 is a flowchart regarding another example of a process performed by the control unit.

DETAILED DESCRIPTION OF EXEMPLARY EMBODIMENTS

<<First Exemplary Embodiment>>

Figure 1:
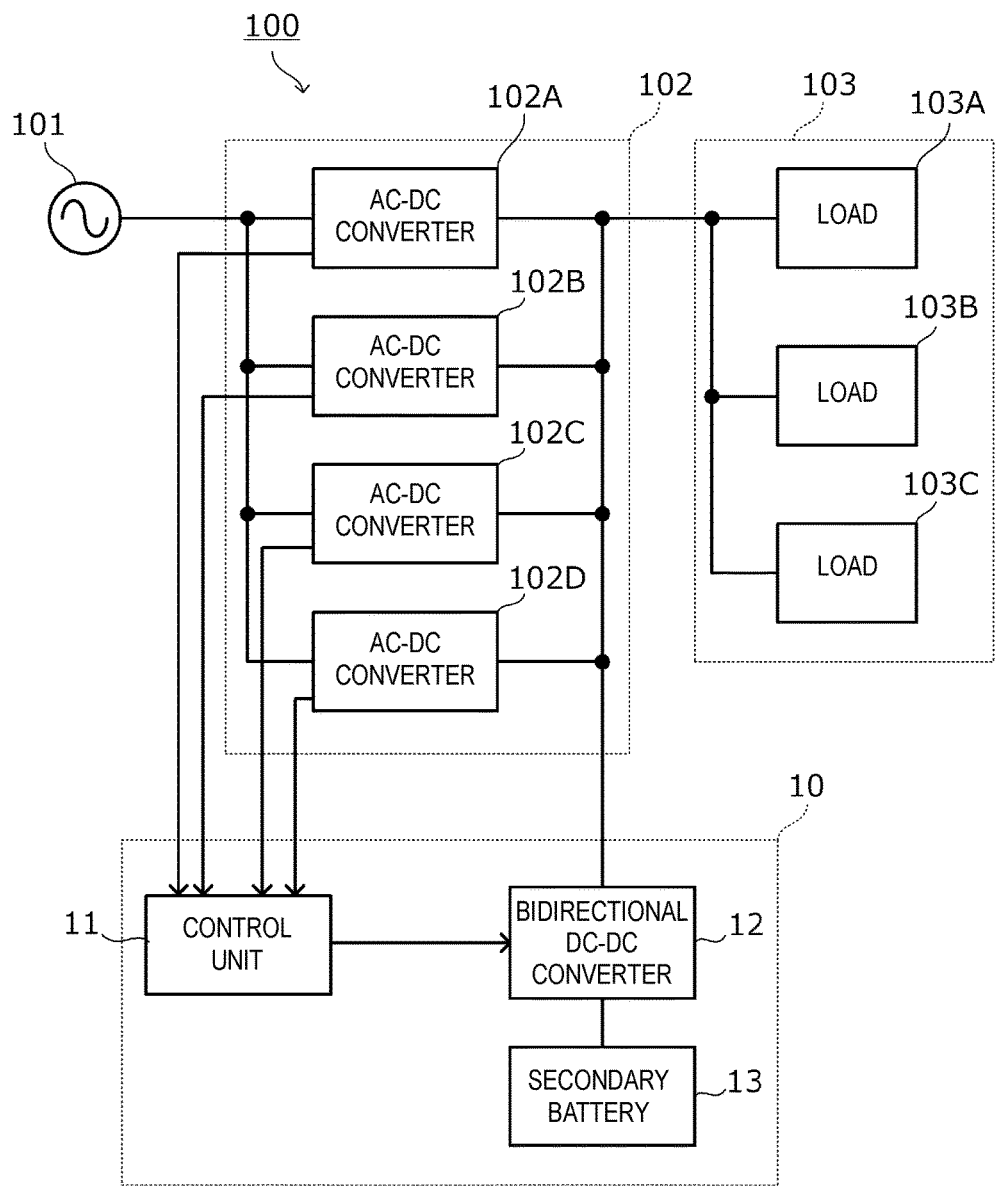
FIG. 1 is a block diagram of a power supply system according to a first exemplary embodiment.

FIG. 1 is a block diagram of a power supply system 100 according to a first exemplary embodiment.

As shown, the power supply system 100 includes a converter unit 102 connected to a commercial power supply 101; a load 103; and a battery module 10.

As an exemplary aspect, the load 103 can include loads 103A, 103B, and 103C. These loads 103A, 103B, and 103C are, for example, blade servers and housed in a housing. The loads 103A, 103B, and 103C are connected in parallel and connected to the converter unit 102. Power is supplied from the converter unit 102 and the battery module 10 to the loads 103A, 103B, and 103C.

Moreover, the converter unit 102 has an AC-DC converter 102A, an AC-DC converter 102B, an AC-DC converter 102C, and an AC-DC converter 102D. The respective AC-DC converters 102A, 102B, 102C, and 102D are connected in parallel between the commercial power supply 101 and the load 103. Each of the AC-DC converters 102A, 102B, 102C, and 102D is configured to convert an AC voltage (for example, 200 V) from the commercial power supply 101 to a DC voltage (for example, 12 V) and to supply the DC voltage to the load 103.

The converter unit 102 has redundancy by arranging the AC-DC converters 102A, 102B, 102C, and 102D in parallel. Thus, even if one of the AC-DC converters 102A, 102B, 102C, and 102D stops due to breakdown or the like, the remaining AC-DC converters are configured to supply power to the load 103. In a state where the converter unit 102 is operating at all times, it is possible to replace an AC-DC converter in which a trouble has occurred.

Each of the AC-DC converters 102A, 102B, 102C, and 102D is configured to compare the output current thereof to the output currents of the other AC-DC converters and equilibrate the output currents (a so-called "current share function"). That is, the output currents of the AC-DC converters 102A, 102B, 102C, and 102D are equal to each other. By having this function, it is possible to supply power obtained by multiplying rated power for one converter by the number of converters connected in parallel, to a load. In addition, the life is extended by equilibrating the load of each converter operating in parallel.

Moreover, each of the AC-DC converters 102A, 102B, 102C, and 102D is configured to droop the output voltage thereof as the output current exceeds a predetermined value.

Figure 2:
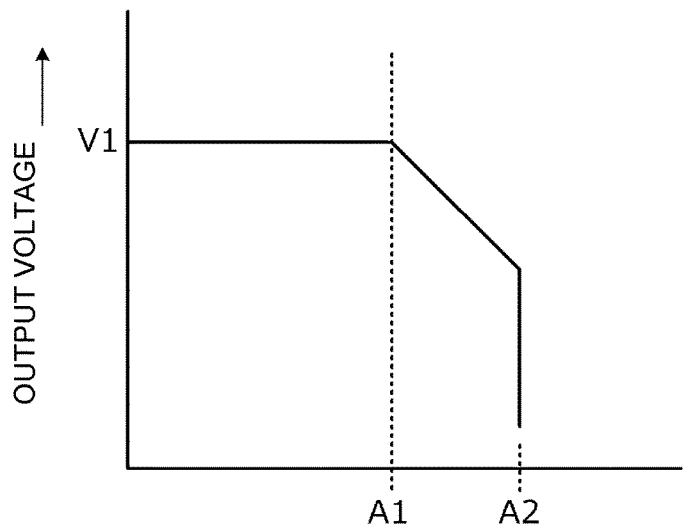
FIG. 2 is a diagram showing output voltage characteristics of an AC-DC converter.

FIG. 2 is a diagram showing the characteristics of an output voltage with respect to an output current of each of the AC-DC converters 102A, 102B, 102C, and 102D.

Each of the AC-DC converters 102A, 102B, 102C, and 102D performs constant voltage control in which a constant voltage V1 is outputted until the output current reaches a threshold A1. The threshold A1 is an example of a "predetermined value" according to the exemplary aspects, of the present disclosure. When the output current exceeds the threshold A1 and a heavy load state is caused, each of the AC-DC converters 102A, 102B, 102C, and 102D activates overcurrent limit in order to prevent burnout or the like. At this time, in order to continue power supply even in a heavy load state to maintain operation of the load 103, the output voltage is decreased with increase of the output current in a state where the output current exceeds the predetermined value (e.g., threshold A1). When the output current reaches a threshold A2, each of the AC-DC converters 102A, 102B, 102C, and 102D performs constant current control.

That is, when the load 103 is in a light load state, the constant voltage V1 is supplied from the converter unit 102. When the load 103 enters a heavy load state, the voltage supplied from the converter unit 102 to the load 103 decreases with increase of a load current. With the decrease of the voltage, operation of the load 103, which is a blade server, for example, becomes unstable.

In the present embodiment, the battery module 10 (see FIG. 1) is connected in parallel with the converter unit 102 with respect to the load 103. The battery module 10 assists in current supply to the load 103 such that a voltage decrease is not caused when the load 103 is in a heavy load state. Then, the battery module 10 stabilizes operation of the load 103 by supplying a stable voltage to the load 103.

According to the exemplary aspect, the battery module 10 includes a control unit 11, a bidirectional DC-DC converter 12, and a secondary battery 13. The secondary battery 13 is, for example, a lithium ion battery or the like. The control unit 11 and the bidirectional DC-DC converter 12 are an example of a "voltage control unit" according to the present disclosure. In addition, the control unit 11 is an example of an "output current value acquisition unit" according to the present disclosure.

The bidirectional DC-DC converter 12 is connected between an output portion of the converter unit 102 and the secondary battery 13. The bidirectional DC-DC converter 12 is, for example, a circuit obtained by combining a step-up chopper and a step-down chopper, and converts a voltage in both directions between the output portion of the converter unit 102 and the secondary battery 13. That is, the bidirectional DC-DC converter 12 converts the discharge voltage of the secondary battery 13 and outputs the discharge voltage to the load 103, or converts the output voltage of the converter unit 102 and charges the secondary battery 13.

The control unit 11 is, for example, a microcomputer, and receives a current share signal from each of the AC-DC converters 102A, 102B, 102C, and 102D as appropriate, controls switching of the bidirectional DC-DC converter 12, and controls charge/discharge of the secondary battery 13. The current share signal includes an output current value of each of the AC-DC converters 102A, 102B, 102C, and 102D that is equilibrated by the current share function.

Figure 3:
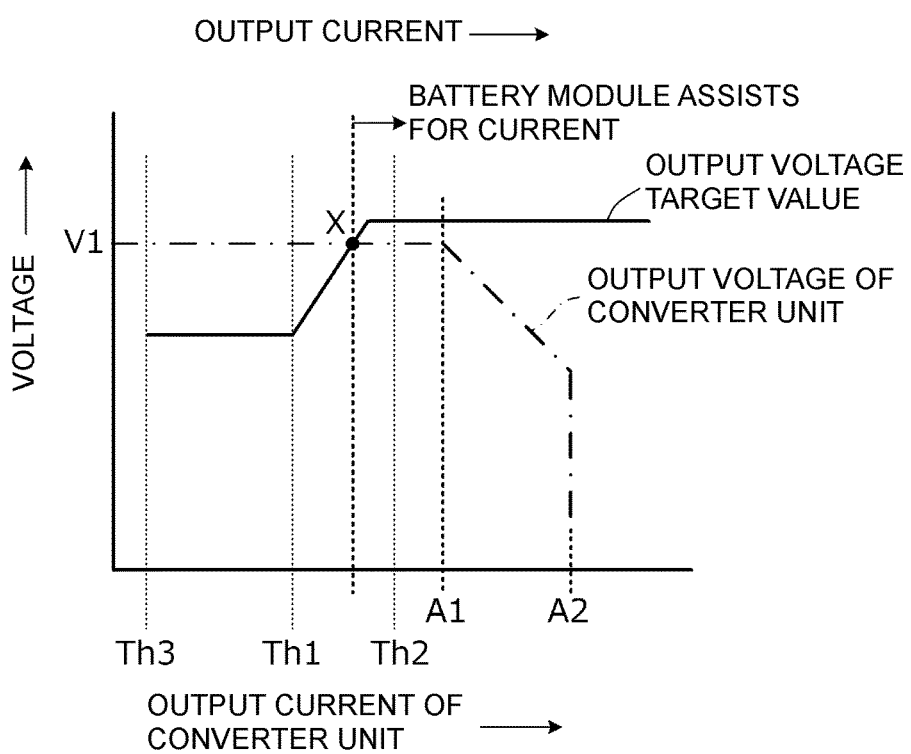
FIG. 3 is a diagram showing output voltage characteristics of the AC-DC converter and a battery module.

FIG. 3 is a diagram showing characteristics of the output voltage with respect to the output current of the converter unit 102 and a relationship of an output voltage target value of the bidirectional DC-DC converter 12 with respect to the output current of the converter unit 102. In FIG. 3, the characteristics of the output voltage with respect to the output current of the converter unit 102 are indicated by an alternate long and short dash line. In addition, the relationship of the output voltage target value of the bidirectional DC-DC converter 12 with respect to the output current of the converter unit 102 is indicated by a solid line.

The control unit 11 shown in FIG. 1 is configured to set the output voltage target value of the bidirectional DC-DC converter 12 as indicated by the alternate long and short dash line in FIG. 3. That is, the output voltage target value is set such that: when the output current value of the converter unit 102 is equal to or higher than a first threshold Th1 and lower than the threshold A1, the output voltage target value increases with increase of the output current value. Moreover, when the output current value is between a second threshold Th2 and lower than the threshold A1 (and also higher than the first threshold Th1), the output voltage target value is higher than the constant voltage V1 outputted by the converter unit 102.

By setting the above output voltage target value of the bidirectional DC-DC converter 12, current supply to the load 103 is started under a condition (state) X where the output voltage target value of the bidirectional DC-DC converter 12 exceeds the constant voltage V1.

A point X in FIG. 3 is a point at which the output voltage target value of the bidirectional DC-DC converter 12 and the output voltage of the converter unit 102 coincide with each other. When the output current of the converter unit 102 exceeds the point X, the output voltage target value of the bidirectional DC-DC converter 12 exceeds the constant voltage V1 outputted by the converter unit 102.

Figure 4:
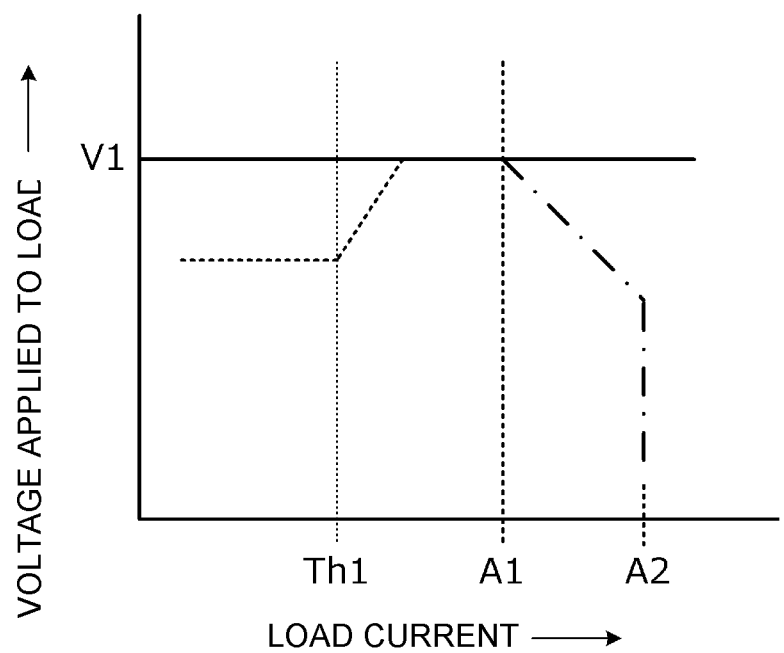
FIG. 4 is a characteristic diagram of a load current as seen from a load side, and a voltage applied to the load.

FIG. 4 is a characteristic diagram of a load current as seen from the load side, and a voltage applied to the load. As is obvious from comparison between FIG. 3 and FIG. 4, even when the output current of the converter unit 102 exceeds the point X and a current is supplied from the battery module 10 to the load, the voltage applied to the load remains unchanged. Therefore, the voltage applied to the load is stable at approximately V1, and flat characteristics are exhibited.

In a heavy load state, the load current increases. Accordingly, the load rate of each of the AC-DC converters 102A, 102B, 102C, and 102D rises, and the output current increases. As a result, due to conduction loss and the like, the efficiency of the AC-DC converters 102A, 102B, 102C, and 102D decreases. However, since the battery module 10 assists in current supply of the converter unit 102 in a heavy load state as described above, the load rate of each of the AC-DC converters 102A, 102B, 102C, and 102D decreases and it is possible to efficiently operate the respective AC-DC converters 102A, 102B, 102C, and 102D.

In the present embodiment, the AC-DC converters 102A, 102B, 102C, and 102D each have a function to droop the output voltage thereof with increase of the output current, but may not have this function. Even in this case, if the threshold Th2 is set according to the load current when the load 103 is in a heavy load state, a constant voltage (constant voltage V1) can be supplied from the battery module 10 to the load 103 even in a heavy load state.

Figure 5A:
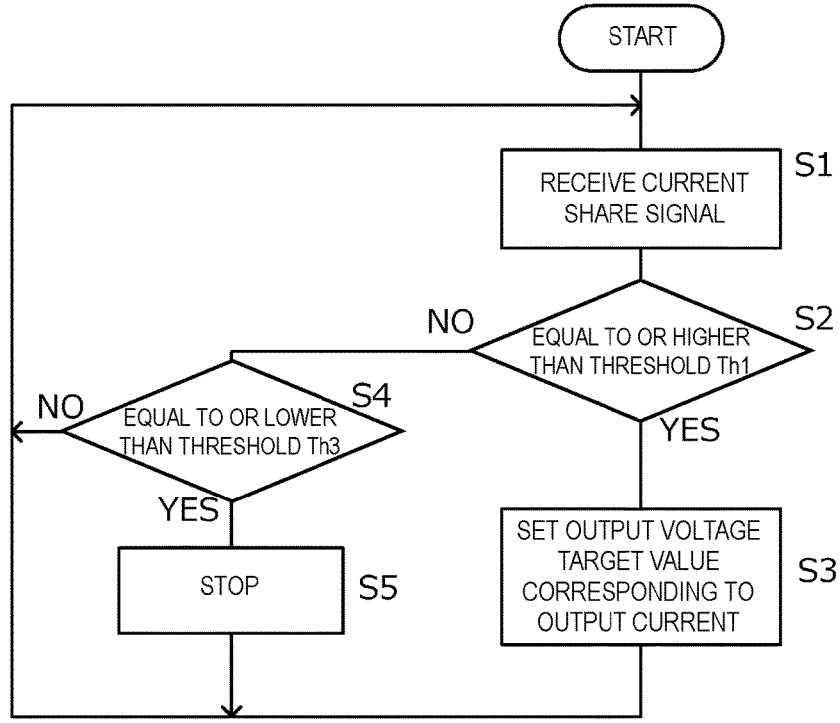
FIGS. 5(A) and 5(B) are flowcharts of processes performed by a control unit.
Figure 5B:
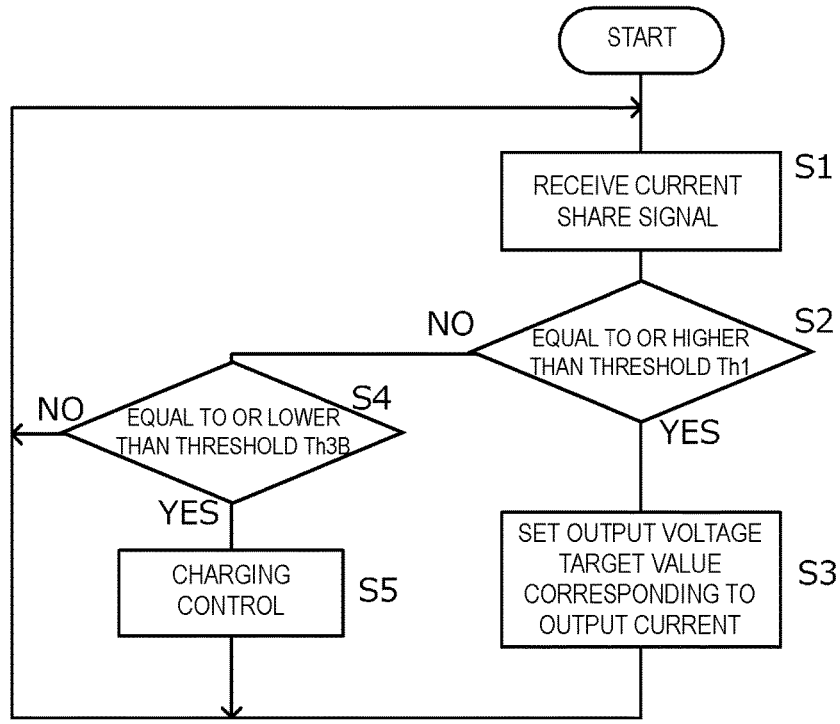

FIGS. 5(A) and 5(B) are flowcharts of processes performed by the control unit 11.

In the example shown in FIG. 5(A), the control unit 11 receives a current share signal as appropriate (S1). When the output current value of the converter unit 102 is equal to or higher than the first threshold Th1 on the basis of the current share signal (S2: YES), the control unit 11 sets an output voltage target value corresponding to the output current of the converter unit 102 (S3). Accordingly, the bidirectional DC-DC converter 12 operates such that the output voltage thereof is the output voltage target value.

When the output current value from the converter unit 102 is not equal to or higher than the first threshold Th1 (S2: NO), the control unit 11 determines whether the output current value is equal to or lower than a third threshold Th3 (see FIG. 3) (S4). The third threshold Th3 is less than the first threshold Th1, is for the case when the load 103 is in a light load state, and is changeable as appropriate.

When the output current value included in the current share signal is equal to or lower than the threshold Th3 (S4: YES), the control unit 11 stops switching control of the bidirectional DC-DC converter 12 (S5). Accordingly, switching loss and the like due to the switching control can be reduced.

When the output current value of the converter unit 102 is not equal to or lower than the threshold Th3 (S4: NO), the control unit 11 returns to reception of a current share signal.

In the example shown in FIG. 5(B), when the output current value of the converter unit 102 is equal to or lower than a threshold Th3B (S4: YES), the control unit 11 is configured to perform charge control in which the secondary battery 13 is charged by the output power of the converter unit 102 (S5). By charging the secondary battery 13 in such a light load state, the charge voltage of the secondary battery 13 can be decreased without increasing the load rate of the converter unit 102, and thus it is possible to prepare for a sudden load variation of the load 103.

<<Second Exemplary Embodiment>>

In a second exemplary embodiment, an example is provided of a power supply system in which a voltage control unit is OR-connected to a converter unit via an OR connection switching element.

Figure 6:
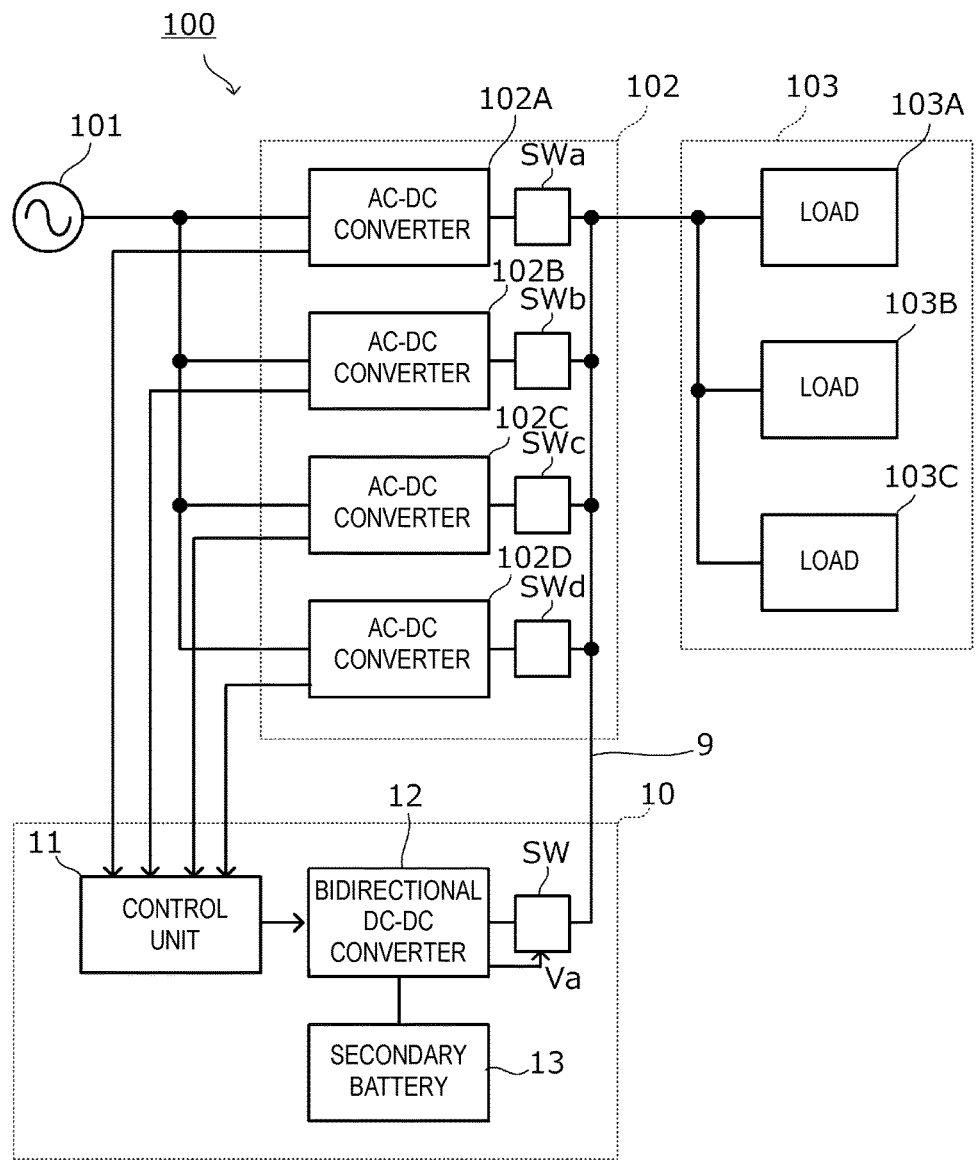
FIG. 6 is a block diagram of a power supply system according to a second exemplary embodiment.

FIG. 6 is a block diagram of a power supply system according to the second embodiment. The power supply system 100 includes: a converter unit 102 connected to a commercial power supply 101; a load 103; and a battery module 10.

An OR connection switching element SW is connected to the load-connection side of a bidirectional DC-DC converter 12. The bidirectional DC-DC converter 12 is OR-connected to a bus 9 via the OR connection switching element SW. The OR connection switching element SW is controlled by a current flowing through the OR connection switching element SW and a control signal outputted from the bidirectional DC-DC converter 12. Moreover, the control unit 11 is configured to detect the total output current of the output currents of AC-DC converters 102A, 102B, 102C, and 102D and the bidirectional DC-DC converter 12, that is, a load current, and in turn turn off the OR connection switching element SW when the load current is less than a later-described fourth threshold.

As further shown, OR connection switching elements SWa, SWb, SWc, and SWd are connected to the load-connection sides of the AC-DC converters 102A, 102B, 102C, and 102D, respectively. The AC-DC converters 102A, 102B, 102C, and 102D are connected to the bus 9 via the OR connection switching elements SWa, SWb, SWc, and SWd, respectively.

The other configuration is the same as that of the power supply system 100 shown in FIG. 1 in the first embodiment.

Figure 7A:
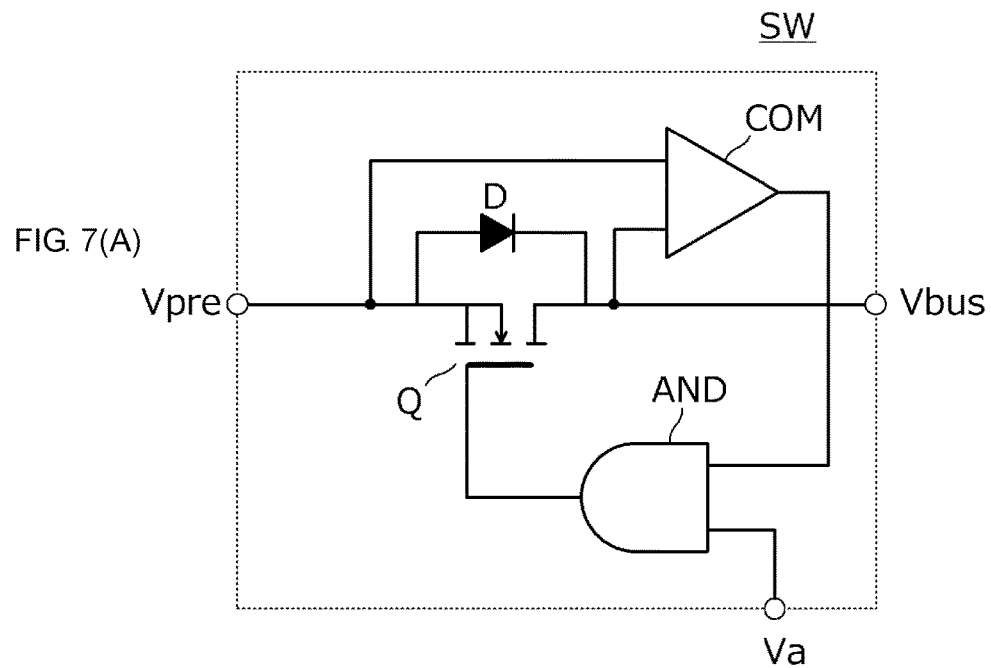
FIG. 7(A) is a circuit diagram of the OR connection switching element SW.
Figure 7B:
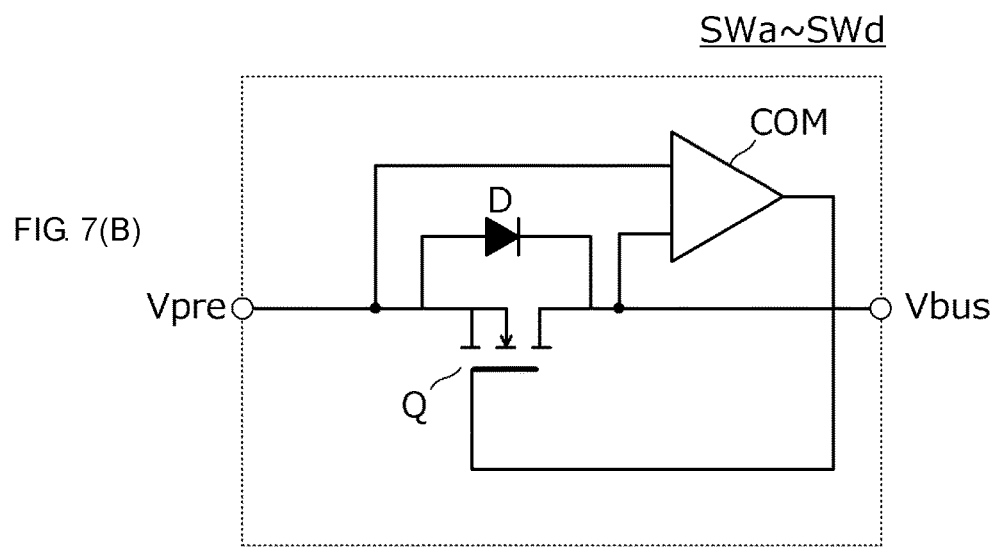
FIG. 7(B) is a circuit diagram of the OR connection switching elements SWa, SWb, SWc, and SWd.

FIG. 7(A) is a circuit diagram of the OR connection switching element SW, and FIG. 7(B) is a circuit diagram of the OR connection switching elements SWa, SWb, SWc, and SWd.

The OR connection switching element SW shown in FIG. 7(A) includes an OR connection FET Q, a comparator COM, and an AND gate AND. A diode D in the drawing is the body diode of the FET Q. The comparator COM is connected between the drain and the source of the FET Q, and causes the output thereof to be an "H" level when the voltage between the drain and the source satisfies source voltage>drain voltage. The AND gate turns on the FET Q when the output of the comparator COM is an "H" level and a control signal Va is an "H" level.

The OR connection switching elements SWa, SWb, SWc, and SWd shown in FIG. 7(B) each include an OR connection FET Q and a comparator COM. A diode D in the drawing is the body diode of the FET Q. The comparator COM is connected between the drain and the source of the FET Q, and turns on the FET Q when the voltage between the drain and the source satisfies source voltage>drain voltage.

FIG. 8 illustrates an example of a relationship of an output voltage target value of the bidirectional DC-DC converter 12 with respect to the output current of the converter unit 102 and change of the output voltage of the bidirectional DC-DC converter 12 over time. In FIG. 8, Vbus is the rated bus voltage of the bus 9 (for example, 12.3 V), and Vpre is the output voltage of the bidirectional DC-DC converter 12 in a state where the OR connection switching element SW is off. In addition, in FIG. 8, an output current A0 of the converter unit is a current value, at which the battery module 10 starts current assist (i.e., a critical current value), as shown in FIG. 3 in first embodiment. The critical current value A0 can be considered a current value that corresponds to a constant voltage of the converter unit 102 (i.e., a bus voltage) in a relationship between the output current of the converter unit 102 and the output voltage target value. Moreover, a threshold (i.e., the fourth threshold) Th4 of a current at which a back-flow current flows through the bidirectional DC-DC converter 12 and the OR connection FET Q is turned off is set so as to be lower than the critical current value A0.

An example of operation of the power supply system of the present embodiment is as follows.

First, when a state where the battery module 10 (the bidirectional DC-DC converter 12) assists the bus 9 for current is caused, the output of the comparator COM shown in FIG. 7(A) becomes an "H" level, and the control signal Va also becomes an "H" level. Therefore, the FET Q is turned on.

Thereafter, a case where a current flowing through the load 103 (a load current) reduces from the state where the battery module 10 assists the bus 9 for current, is considered. This change is as shown by an arrow of an obliquely left down direction in FIG. 8. When the output current of the converter unit 102 becomes less than the critical current value A0, the current assist is no longer performed. When the output current of the converter unit 102 further reduces and becomes less than the threshold Th4, the control signal Va shown in FIG. 7(A) temporarily becomes an "L" level and the FET Q is turned off. In a state where a forward current is generated, the FET Q is desired to be turned on, and thus the comparator COM is set such that back-flow is permitted to some degree. That is, in some cases, the comparator COM outputs an "H" level even when a state where a back-flow current flows is caused. Even in such a case, the FET Q of the OR connection switching element SW is assuredly turned off by the control signal Va.

FIG. 9 illustrates an example of operation when the state of the FET Q is changed by an "L" level signal that is the control signal Va.

In a state where a forward current is generated, a threshold: Th5 of (Vbus−Vpre) at which the output of the comparator COM is changed from "L" to "H" is set to a positive value in order to turn on the FET Q. In addition, a threshold: Th6 of (Vbus−Vpre) at which the output of the comparator COM is changed from "H" to "L" is set to a higher value than Th5 such that ON/OFF of the FET Q is not frequently repeated. For example, when Th5=2 mV, Th6=10 mV, and ON resistance of the FET Q=1 mΩ, a back-flow current of 10 A needs to be generated for the FET Q to change from ON to OFF in an existing method in which only a comparator COM is used. On the other hand, in the exemplary aspect, in a condition of the output voltage target value at which a forward current is not generated (if Vbus=12.3 V, Vpre=12.292 V), a potential difference of Vbus−Vpre=8 mV is generated by temporarily turning off the FET Q by the control signal Va ("L" signal). By setting a threshold for temporarily turning off the FET Q as a condition that (Vbus−Vpre) when the FET Q is turned off is higher than Th5, an OFF state of the FET Q is continued by the comparator COM after the FET Q is temporarily turned off. Therefore, since it is possible to turn off the FET Q even when a high back-flow current is not generated, a high current does not flow into the FET Q from the Vbus, and it is possible to realize a power supply system that stably maintains Vbus.

Although the power supply system 100 according to each embodiment has been described above, the specific configuration of the power supply system 100 is changeable as appropriate.

According to the exemplary embodiment, the control unit 11 is configured to control switching of the bidirectional DC-DC converter 12 such that the relationship of the output voltage target value of the bidirectional DC-DC converter 12 with respect to the output current of the converter unit 102 is as shown in FIG. 3. The voltage characteristics are determined, for example, by a program. In addition, the relationship between the output current value and the output voltage target value is held in a programmable state and is changeable by rewriting or the like. For example, the gradient at which the output voltage of the bidirectional DC-DC converter 12 is linearly increased may be changeable. If the gradient is made gentler, it is possible to prevent occurrence of chattering in the bidirectional DC-DC converter 12.

The control unit 11 can be further configured to perform control such that the output voltage of the bidirectional DC-DC converter 12 is increased as in an exponential saturation curve. By making the voltage characteristics changeable as described above, it is possible to adjust a condition (state) for supplying the charge voltage of the secondary battery 13 to the load. Then, the charge voltage of the secondary battery 13 is supplied to the load 103 in a condition (state) where the conversion efficiency of the converter unit 102 is good, such that a constant voltage is continuously supplied to the load 103, whereby it is possible to keep a state where the efficiency is good.

By changing the voltage characteristics (the thresholds Th1 and Th2, etc.), it is possible to optionally set limitation of supplied power from the commercial power supply in accordance with the specifications of input of the power supply system (the commercial power supply) without changing the output voltage characteristics of the convertor.

Change of the voltage characteristics may be performed during operation of the power supply system 100. In this case, by sequentially adjusting the load rate of each of the AC-DC converters 102A, 102B, 102C, and 102D (for example, decreasing the load rate when the ambient temperature or the convertor temperature is high), it is possible to reduce stress of the AC-DC converters 102A, 102B, 102C, and 102D, so that the life of the AC-DC converters 102A, 102B, 102C, and 102D is extended.

By temporarily decreasing the load rate of the convertor at the time of instantaneous blackout, it is possible to use the convertor in a state where the instantaneous blackout retention time of the convertor is long, so that it is possible to continuously operate the system even at the time of long instantaneous blackout. In addition, by adjusting the ratio of the output power of the convertor and the output power of the battery module 10 in accordance with integrated power of the commercial power supply, it is possible to prevent exceeding contracted power of the commercial power supply.

The charge capacity of the secondary battery 13 may be detected, and the threshold Th1 may be increased when the charge capacity decreases. Then, start of discharge of the secondary battery 13 may be delayed, and the secondary battery 13 may be charged in this period. Accordingly, it is possible to prevent reduction of the charge capacity of the secondary battery 13.

When the AC-DC converters 102A, 102B, 102C, and 102D have stopped, the control unit 11 may acquire a power supply stop signal from the AC-DC converters 102A, 102B, 102C, and 102D, and may perform control such that the output voltage of the battery module 10 is equal to a normal output voltage of the AC-DC converters 102A, 102B, 102C, and 102D (for example, 12 V). Accordingly, it is possible to supply a constant voltage to the load 103 even during blackout.

The converter unit 102 has the AC-DC converters 102A, 102B, 102C, and 102D connected in parallel. However, when the power supply is a DC power supply, the converter unit 102 may be configured to have DC-DC converters connected in parallel. In addition, as the converter unit 102, it is possible to use one having general constant voltage output characteristics, and it is easy to add the battery module 10 to an existing power supply system.

REFERENCE SIGNS LIST

A1 threshold (predetermined value)
A2 threshold
AND AND gate
COM comparator
Q FET
SW, SWa, SWb, SWc, SWd OR connection switching element
V1 constant voltage
Th1 (first threshold)
Th2 (second threshold)
Th3 (third threshold)
Th4 (fourth threshold)
9 bus
10 battery module
11 control unit
12 bidirectional DC-DC converter
13 secondary battery
100 power supply system
101 commercial power supply
102 converter unit
102A, 102B, 102C, 102D AC-DC converter
103 load
103A, 103B, 103C load

The invention claimed is:

1. A battery module voltage control device comprising:
a voltage control unit connected between a load and a secondary battery and configured to control a discharge voltage of the secondary battery to an output voltage target value for a voltage to be outputted to the load, and to output the discharge voltage to the load; and
an output current value acquisition unit configured to acquire a value of an output current of a converter unit that is configured to perform constant voltage control for outputting a predetermined constant voltage to the load when the value of the output current is equal to or lower than a predetermined value,
wherein the voltage control unit is configured to set the output voltage target value such that, when the acquired value of the output current is equal to or higher than a first threshold that is lower than the predetermined value, the output voltage target value increases with increase of the output current until the output voltage target value exceeds a value of the predetermined constant voltage of the converter unit, and, when the acquired value of the output current is between the first threshold and a second threshold, which is greater than the first threshold and lower than the predetermined value, the output voltage target value exceeds the value of the predetermined constant voltage of the converter unit.

2. The battery module voltage control device according to claim 1, wherein the voltage control unit comprises the output current value acquisition unit.

3. The battery module voltage control device according to claim 1, wherein the voltage control unit is configured to stop voltage control of the converter unit when the acquired value of the output current is equal to or lower than a third threshold that is lower than the first threshold.

4. The battery module voltage control device according to claim 1, wherein the voltage control unit is configured to hold a relationship between the value of the output current and the output voltage target value in a programmable state.

5. The battery module voltage control device according to claim 1, wherein the voltage control unit is configured to charge the secondary battery with output power of the converter unit when the acquired value of the output current is less than the first threshold.

6. The battery module voltage control device according to claim 1,
wherein the voltage control unit comprises a load-connection side that is OR-connected to the converter unit by an OR connection switching element, and
wherein the voltage control unit is configured to temporarily cut off the OR connection switching element when the acquired value of the output current of the converter unit is equal to or less than a fourth threshold that is lower than a critical current value corresponding to the constant voltage of the converter unit in a relationship between the value of the output current and the output voltage target value.

7. A battery module comprising:
a secondary battery;
a voltage control unit connected between a load and the secondary battery and configured to control a discharge voltage of the secondary battery to an output voltage target value for a voltage to be outputted to the load, and to output the discharge voltage to the load; and
an output current value acquisition unit configured to acquire a value of an output current of a converter unit that is configured to perform constant voltage control for outputting a predetermined constant voltage to the load when the value of the output current is equal to or lower than a predetermined value,
wherein the voltage control unit is configured to set the output voltage target value such that, when the acquired value of the output current is equal to or higher than a first threshold that is lower than the predetermined value, the output voltage target value increases with increase of the output current until the output voltage target value exceeds a value of the predetermined constant voltage of the converter unit, and, when the acquired value of the output current is between the first threshold and a second threshold, which is greater than the first threshold and lower than the predetermined value, the output voltage target value exceeds the value of the predetermined constant voltage of the converter unit.

8. The battery module according to claim 7, wherein the voltage control unit comprises the output current value acquisition unit.

9. The battery module according to claim 7, wherein the voltage control unit is configured to stop voltage control of the converter unit when the acquired value of the output current is equal to or lower than a third threshold that is lower than the first threshold.

10. The battery module according to claim 7, wherein the voltage control unit is configured to hold a relationship between the value of the output current and the output voltage target value in a programmable state.

11. The battery module according to claim 7, wherein the voltage control unit is configured to charge the secondary battery with output power of the converter unit when the acquired value of the output current is less than the first threshold.

12. The battery module according to claim 7,
wherein the voltage control unit comprises a load-connection side that is OR-connected to the converter unit by an OR connection switching element, and
wherein the voltage control unit is configured to temporarily cut off the OR connection switching element when the acquired value of the output current of the converter unit is equal to or less than a fourth threshold that is lower than a critical current value corresponding to the constant voltage of the converter unit in a relationship between the value of the output current and the output voltage target value.

13. A power supply system comprising:
a converter unit configured to perform constant voltage control for outputting a predetermined constant voltage to a load when an output current is equal to or lower than a predetermined value;
a secondary battery;
a voltage control unit connected between the load and the secondary battery and configured to control a discharge voltage of the secondary battery to an output voltage target value for a voltage to be outputted to the load, and to output the discharge voltage to the load; and
an output current value acquisition unit configured to acquire a value of an output current value of the converter unit,
wherein the voltage control unit is configured to set the output voltage target value such that, when the acquired value of the output current is equal to or higher than a first threshold that is lower than the predetermined value, the output voltage target value increases with increase of the output current until the output voltage target value exceeds a value of the predetermined constant voltage of the converter unit, and, when the acquired value of the output current is between the first threshold and a second threshold, which is greater than the first threshold and lower than the predetermined value, the output voltage target value exceeds the value of the predetermined constant voltage of the converter unit.

14. The power supply system according to claim 13, wherein the voltage control unit comprises the output current value acquisition unit.

15. The power supply system according to claim 13, wherein the voltage control unit is configured to stop voltage control of the converter unit when the acquired value of the output current is equal to or lower than a third threshold that is lower than the first threshold.

16. The power supply system according to claim 13, wherein the voltage control unit is configured to hold a relationship between the value of the output current and the output voltage target value in a programmable state.

17. The power supply system according to claim 13, wherein the converter unit comprises a plurality of convertors connected in parallel and each having a current share function based on a current share signal.

18. The power supply system according to claim 17, wherein the output current value acquisition unit is configured to acquire the value of the output current of the converter unit based on the current share signal from the converter unit.

19. The power supply system according to claim 13, wherein the voltage control unit is configured to charge the secondary battery with output power of the converter unit when the acquired value of the output current is less than the first threshold.

20. The power supply system according to claim 13,
wherein the voltage control unit comprises a load-connection side that is OR-connected to the converter unit by an OR connection switching element, and
wherein the voltage control unit is configured to temporarily cut off the OR connection switching element when the acquired value of the output current of the converter unit is equal to or less than a fourth threshold that is lower than a critical current value corresponding to the constant voltage of the converter unit in a relationship between the value of the output current and the output voltage target value.

* * * * *